United States Patent Office 3,551,420
Patented Dec. 29, 1970

3,551,420
1,2-DIHYDRO - 1 - HYDROXY-6-ALKYL-2-(AMINO-METHYLIMINO)PYRIMIDINES AND 1,6 - DIHYDRO-1-HYDROXY - 2 - ALKYL - 6-(AMINO-METHYLIMINO)PYRIMIDINES
William C. Anthony, Portage, Mich., assignor to The Upjohn Company, Kalamazoo, Mich., a corporation of Delaware
No Drawing. Filed Jan. 23, 1967, Ser. No. 610,800
Int. Cl. C07d 51/34
U.S. Cl. 260—247.5                     7 Claims

ABSTRACT OF THE DISCLOSURE 1,2-dihydro-1-hydroxy-6-alkyl-2 - (aminomethylimino) pyrimidines and 1,6 - dihydro - 1 - hydroxy - 2 - alkyl-6-(aminomethylimino)pyrimidines and methods of their synthesis are disclosed. These compounds are useful for lowering the blood pressure in animals.

BACKGROUND OF THE INVENTION

This invention is directed to the tautomeric forms of pyrimidine-N-oxides and the corresponding acid addition salts thereof.

SUMMARY OF THE INVENTION

The compounds of this invention are pyrimidine-N-oxides which can be 1,2-dihydro-1-hydroxy-6-alkyl-2-(aminomethylimino)pyrimidines represented by the formula I
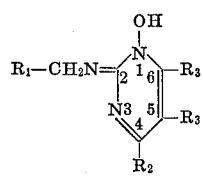

or 1,6-dihydro-1-hydroxy-2-alkyl-6 - (aminomethylimino) pyrimidines represented by the formula II
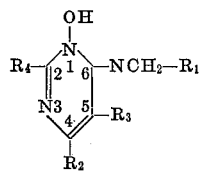

In Formulas I and II, above, $R_1$ and $R_2$ can be substituted amino moieties of the type

in which $R_5$ and $R_6$ are selected from the grouping which includes lower alkyl, lower alkenyl, lower aralkyl, and lower cycloalkyl.

Alternatively, $R_1$ and $R_2$ can be heterocyclic amino moieties selected from the grouping which includes aziridinyl, azetidinyl, pyrrolidinyl, piperidino, hexahydroazepinyl, heptamethylenimino, octamethylenimino, morpholino, and 4-(lower alkyl)piperazinyl. Each of the aforesaid heterocyclic moieties can have attached to the carbon atoms thereof from zero to three lower alkyl substituents, inclusive. Furthermore, a nitrogen atom of each of said heterocyclic moieties is the point of attachment of $R_1$ and $R_2$.

In Formulas I and II, above, $R_3$ can be hydrogen or lower alkyl, and $R_4$ can be lower alkyl.

Also within the purview of the present invention are the corresponding acid addition salts of the compounds represented by Formulas I and II.

The compounds of this invention are useful for lowering the blood pressure in animals.

DETAILED DESCRIPTION

In addition to being represented by Formulas I and II, above, which representation will be adhered to throughout the instant specification for conciseness, the compounds of this invention can also be represented by formulas which indicate the other tautomeric forms of these compounds, to wit:

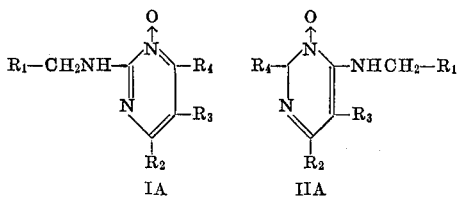

IA            IIA

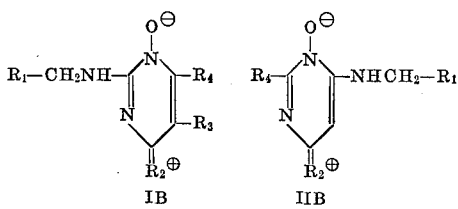

IB            IIB

The present compounds are likely to be mixtures of the above-enumerated tautomeric forms, or in some instances one form or another may predominate, depending on such factors as the nature of the substituents $R_1$, $R_2$, $R_3$, and $R_4$, and also depending on the environment.

Furthermore, the pyrimidines of Formulas I and II are amines and can exist in the non-protonated or free base form, or in the protonated or acid addition salt form, depending on the pH of the environment. They form stable protonates, i.e., mono- or diacid addition salts, on neutralization with suitable acids, for example, hydrochloric, hydrobromic, sulfuric, phosphoric, nitric, acetic, benzoic, salicyclic, glycolic, succinic, nicotinic, tartaric, maleic, malic, pamoic, methanesulfonic, cyclohexanesulfamic, picric, and lactic acids and the like. These acid addition salts are useful for upgrading or purifying the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The term "lower alkyl" as used herein is taken to mean alkyl groups containing from 1 to about 8 carbon atoms, inclusive, and preferably from 1 to about 4 carbon atoms, inclusive. Illustrative lower alkyl groups are methyl, ethyl, propyl, butyl, pentyl, hexyl, heptyl, octyl, and isomeric forms thereof.

The term "lower alkenyl" as used herein is taken to mean alkenyl groups containing from 1 to about 8 carbon atoms, inclusive, and preferably from 1 to about 4 carbon atoms, inclusive. Typical such groups are allyl, 1-methylallyl, 2-methylallyl, 2-butenyl, 3-butenyl, 1,2-dimethylallyl, 1,1-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,1,2-trimethylallyl, 1,3-dimethyl-2-butenyl, 1-ethyl-2-butenyl, 4-methyl-2-pentenyl, 2-ethyl-2-pentenyl, 4,4-dimethyl-2-pentenyl, 2-heptenyl, 2-octenyl, 5-octenyl, 1,4-dimethyl-4-hexenyl, and the like.

The term "lower aralkyl" as used herein is taken to mean aralkyl groups containing from 7 to about 12 carbon atoms, inclusive, and preferably from 7 to about 10 carbon atoms, inclusive. Examples of lower aralkyl groups are benzyl, phenethyl, 1-phenylethyl, 2-phenylpropyl, 4-phenylbutyl, 6-phenylhexyl, 5-phenyl-2-methylpentyl, 1-naphthylmethyl, 2-(1-naphthyl)ethyl, 2 - (2 - naphthyl) ethyl and the like.

The term "lower cycloalkyl" as used herein is taken to mean cycloalkyl groups containing a ring structure having from 3 to about 8 carbon atoms, inclusive, and preferably from about 5 to about 8 carbon atoms, inclusive, Also contemplated within the meaning of the foregoing term are lower alkyl substituents on the ring structure. Exemplary lower cycloalkyl groups are:

cyclopropyl,
2-methylcyclopropyl,
2,2-dimethylcyclopropyl,
2,3-diethylcyclopropyl,
2-butylcyclopropyl,
cyclobutyl,
2-methylcyclobutyl,
3-propylcyclobutyl,
2,3,4-triethylcyclobutyl,
cyclopentyl,
2,2-dimethylcyclopentyl,
3-pentylcyclopentyl,
3-tert.-butylcyclopentyl,
cyclohexyl,
4-tert.-butylcyclohexyl,
3-isopropylcyclohexyl,
2,2-dimethylcyclohexyl,
cycloheptyl,
cyclooctyl, and
the like.

Examples of heterocyclic moieties within the scope of $R_1$ and $R_2$, in addition to those already mentioned above, are:

2-methylaziridinyl,
2-ethylaziridinyl,
2-butylaziridinyl,
2,3-dimethylaziridinyl,
2,2-dimethylaziridinyl,
2-methylazetidinyl,
3-methylazetidinyl,
2-octylazetidinyl,
2,2-dimethylazetidinyl,
3,3-diethylazetidinyl,
2,4,4-trimethylazetidinyl,
2,3,4-trimethylazetidinyl,
2-methylpyrrolidinyl,
3-butylpyrrolidinyl,
2-isohexylpyrrolidinyl,
2,3-dimethylpyrrolidinyl,
2,2-dimethylpyrrolidinyl,
2,5-diethylpyrrolidinyl,
3-tert.-butylpyrrolidinyl,
2,3,5-trimethylpyrrolidinyl,
3,4-dioctylpyrrolidinyl,
2-methylpiperidino,
3-methylpiperidino,
4-methylpiperidino,
3-isopropylpiperidino,
4-tert.-butylpiperidino,
2-methyl-5-ethylpiperidino,
3,5-dipentylpiperidino,
2,4,6-trimethylpiperidino,
2,6-dimethyl-4-octylpiperidino,
2,3,5-triethylpiperidino,
2-ethylhexahydroazepinyl,
4-tert.-butylhexahydroazepinyl,
3-heptylhexahydroazepinyl,
2,4-dimethylhexahydroazepinyl,
3,3-dimethylhexahydroazepinyl,
2,4,6-tripropylhexahydroazepinyl,
2-methylheptamethylenimino,
5-butylheptamethylenimino,
2,4-diisopropylheptamethylenimino,
3,3-diethylheptamethylenimino,
2,5,8-trimethylheptamethylenimino,
3-methyloctamethylenimino,
2,9-diethyloctamethylenimino,
4-isooctyloctamethylenimino,
2-ethylmorpholino,
2-methyl-5-ethylorpholino,
3,3-dimethylmorpholino,
2,6-di-tert.-butylmorpholino,
4-methylpiperazinyl,
4-isopropylpiperazinyl, and
the like. In each of the above examples of heterocyclic moieties, the free valence, and hence the point of attachment to a carbon atom of the pyrimidine ring, or to the carbon atom of the methylene group of $R_1$—$CH_2N=$, is at the heterocyclic nitrogen atom.

The compounds represented by Formulas I and II can be prepared by reacting a 1,2-dihydro-1-hydroxy-6-alkyl-2-imino-pyrimidine of the type III
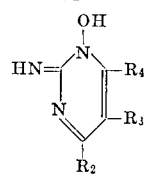

or a 1,6-dihydro-1-hydroxy-2-alkyl-6-iminopyrimidine of the type

IV
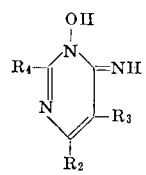

with formaldehyde and with a secondary amine of the type $R_1H$, where the meanings of $R_1$, $R_2$, $R_3$, and $R_4$ are the same as before. The reaction takes place in an aqueous acid medium at a temperature in the range from about 0° C. to about 90° C., and preferably at about 25° C. For acidification of the reaction medium, acetic acid is preferred; however, other water-soluble acids such as hydrochloric acid, sulfuric acid, phosphoric acid, formic acid, propionic acid, or the like, can also be employed.

The overall reaction sequence can be exemplified by the reaction of a 1,2-dihydro-1-hydroxy-6-alkyl-2-iminopyrimidine (III) with formaldehyde and a secondary amine as follows:

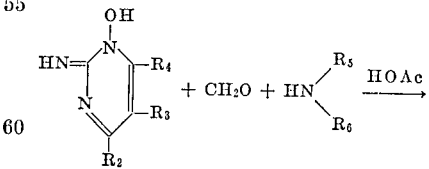

In the foregoing reaction sequence $R_2$, $R_3$, $R_4$, $R_5$, and $R_6$ have the same meaning as before.

The starting materials shown by Formulas III and IV can be produced in accordance with the following reaction sequence, wherein $R_2$, $R_3$, and $R_4$ have the same meaning as before, and where X is fluorine, chlorine, or bromine and $n$ is an integer having a value from zero to three, inclusive:

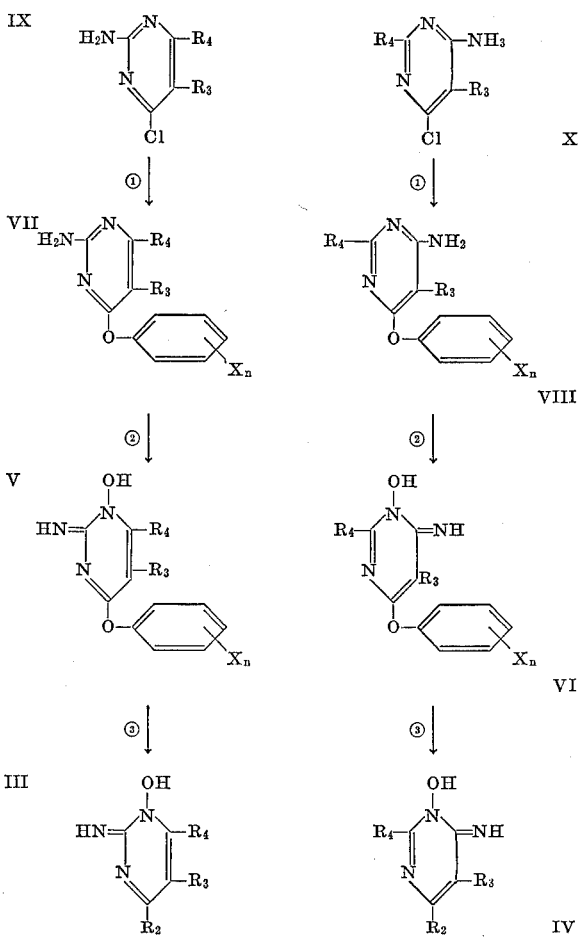

The starting compounds of Formula IX are known or can be prepared according to methods well known in the art, such as the method described by Braker et al., J. Amer. Chem. Soc. 69, 3072 (1947). Similarly, the starting compounds of Formula X are known in the art or can be prepared according to known methods such as the method described by Földi et al., Ber. Deut. Chem. Ges. 75, 755 (1942).

Pyrimidines of Formulas VII and VIII are prepared by reacting the pyrimidines of Formulas IX and X, respectively, with a phenoxide salt of a phenol having the formula:

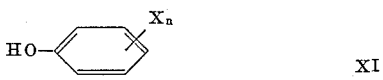

wherein X and $n$ are as defined above (Reaction 1).

The 1,2-dihydro-1-hydroxy-4-phenoxypyrimidines (V) and the 1,6 - dihydro - 1-hydroxy-4-phenoxypyrimidines (VI) are produced by reacting the pyrimidines of Formulas VII and VIII, respectively, with a percarboxylic acid (Reaction 2). Particularly preferred for this purpose are perbenzoic acids of the formula:

wherein W is selected from the group consisting of halogen, lower alkyl, lower alkoxy, and nitro, and $n_1$ is zero to five, inclusive. However, other percarboxylic acids can be used for this oxidation, examples being performic acid, peracetic acid, perpropionic acid, perbutyric acid, perphthalic acid, percamphoric acid, and the like.

The 1,2-dihydro-1-hydroxy-6-alkyl-2-iminopyrimidines (III) and the 1,6-dihydro-1-hydroxy-2-allyl-6-iminopyrimidines (IV), which are the starting materials for the purposes of the present invention, can then be prepared by reacting the compounds of Formulas V and VI, respectively, with a secondary amine of the type $R_2H$ with $R_2$ having the same meaning as above. During the reaction, the phenoxy moiety of Compounds V and VI is displaced by the $R_2$ moiety of the amine (Reaction 3).

Reaction 1, between a Formula IX or Formula X 4-chloropyrimidine and a phenoxide salt of a Formula XI phenol can be carried out by heating a mixture of the pyrimidine and the salt in the range from about 100° to about 200° C., preferably in the range from about 140° to about 180° C., until the desired displacement reaction takes place. Usually about one to about ten hours of heating is sufficient, less time usually being required at the higher temperature, e.g., 180° C. than at the lower temperature, e.g., 140° C.

Alkali metal phenoxides, especially sodium or potassium phenoxides, are preferred although phenoxides of other metals, e.g., magnesium calcium, and aluminum, can be used. One molecular equivalent of the phenoxide salt is required to react with each molecular equivalent of the 4-chloropyrimidine, and there is usually no reason to use other than those molecular proportions, It is advantageous, however, to heat the phenoxide salt and the 4-chloropyrimidine in the presence of about one to about ten or even more molecular equivalents of the phenol corresponding to the phenoxide salt. The phenol then serves as a diluent, and can also serve as a source of the phenoxide salt. In the latter case, one molecular equivalent of a metal hydroxide corresponding to the desired metal phenoxide salt, e.g., sodium hydroxide or potassium hydroxide, is added to a sufficient amount of a Formula XI phenol to produce the desired amount of phenoxide salt and leave enough to serve as the diluent.

In preparing the mixture of the phenoxide salt and the phenol diluent, it is often also advantageous to add the metal hydroxide in solid form, and then remove water by a preliminary heating at about 100° C. The chloropyrimidine is then added to the obtained phenoxide-phenol mixture.

Alternatively, chloropyrimidine, metal hydroxide, and sufficient phenol to form the phenoxide and to serve as a diluent can be mixed together and heated.

In place of or in addition to a phenol diluent, another inert liquid diluent, for example, dimethylformamide, can be used to aid in forming a suitably mobile reaction mixture.

The desired Formula VII or Formula VIII 4-phenoxypyrimidine can be isolated from the reaction mixture by conventional methods, for example, by addition of sufficient aqueous alkali metal hydroxide solution to dissolve the phenol diluent, if one is used, followed by separation of the desired product by filtration or centrifiguration. The phenoxypyrimidine can then be purified, if desired, by conventional methods, for example, by recrystallization from a suitable solvent or mixture of solvents.

Reaction 2 between a Formula VII or VIII 4-phenoxypyrimidine and a percarboxylic acid to produce a Formula V 1,2-dihydro-1-hydroxy-4-phenoxypyrimidine or a Formula VI 1,6-dihydro-1-hydroxy-4-phenoxypyrimidine can be carried out by mixing those two reactants, preferably in the presence of an inert liquid diluent. Although, as mentioned above, percarboxylic acids generally are useful for this oxidation, it is preferred to use the perbenzoic acids of Formula XII. Acids of Formula XII are known in the art or can be prepared by methods known in the art. See, for example, Braun, Organic Syntheses, Coll. vol. I, 2nd ed., 431 (1941) and Silbert et al., J. Org. Chem. 27, 1336 (1962).

In Formula XII, when $n_1$ is 2 or more, the W's can be the same or different. Examples of halogen are fluorine, chlorine, bromine, and iodine. Examples of lower alkyl are methyl, ethyl, propyl, butyl, pentyl, hexyl, heptyl, octyl, and isomeric forms thereof. Examples of lower alkoxy are methoxy, ethoxy, propoxy, butoxy, pentyloxy, hexyloxy, heptyloxy, octyloxy, and isomeric forms thereof. Illustrative oxidizing acids of Formula XII include perbenzoic acid, o-, m-, and p-chloro- and bromoperbenzoic acids, 3,5-dichloroperbenzoic acid, 2,3,5,6-tetrachloroperbenzoic acid, 4-methylperbenzoic acid, 3,4-dimethylperbenzoic acid, pentamethylperbenzoic acid, o-, m-, and p-methoxyperbenzoic acids, 3-nitroperbenzoic acid, 2,4-dinitroperbenzoic acid, 3- chloro-4-methoxyperbenzoic acid, 3-chloro-4-nitroperbenzoic acid, and the like.

In carrying out the reaction between Formula VII or Formula VIII pyrimidine and Formula XII perbenzoic acid, the two reactants are mixed at a temperature usually below about 50° C., preferably in the range from about −10° to about +10° C., although higher or lower temperatures can be used. It is preferred to mix the reactants in the presence of an inert liquid diluent and to stir the mixture until the reaction is substantially complete. For completion the reaction usually requires from about one to about eight hours. Suitable dilents for this purpose include N-(lower-alkyl)pyrrolidones, e.g., N-methylpyrrolidone; lower alkanols, e.g., methanol, ethanol, propanol, isopropyl alcohol, the butanols and the pentanols; lower alkanol and glycol esters of lower alkanoic acids, e.g., ethyl acetate, butyl acetate, pentyl acetate, ethylene glycol monoacetate, diethylene glycol monoacetate; ethers, e.g., diethyl ether, diisopropyl ether, ethylene glycol monoethyl ether, diethylene glycol monobutyl ether; and the like. The molecular ratio of Formula VII or VIII pyrimidine to Formula XII perbenzoic acid can be varied widely. Ratios from about 1:1 to 1:5, and preferably from about 1:1.5 to 1:2.5, are suitable.

The produced 1,2-dihydro-1-hydroxy-4-phenoxypyrimidines of Formula V and the 1,6-dihydro-1-hydroxy-4-phenoxypyrimidines of Formula VI can be isolated from the oxidation reaction mixture by conventional techniques, for example, by successive evaporation of the reaction solvent at reduced pressure, solution of the obtained basic product in aqueous acid, e.g., hydrochloric acid, removal of undesired water-insoluble reaction products by filtration, neutralization of the acidic filtrate, and isolation of the Formula V or VI product by filtration, extraction, or chromatography. The isolated material can be purified by conventional techniques, for example, by recrystallization from a suitable solvent or pair of solvents or by preparation of an acid addition salt, e.g., the hydrochloride or the acid phosphate, and recrystallization of the salt, followed, if desired, by reconversion of the salt to the free base in the usual manner.

Reaction 3, between a Formula V or Formula VI pyrimidine and a secondary amine of Formula $R_2H$, wherein $R_2$ as defined above, can be carried out by mixing those two reactants and heating the mixture in the range from about 100° to about 200° C., preferably in the range from about 125° to about 175° C. At least one molecular equivalent of the amine is mixed with each molecular equivalent of the pyrimidine reactant. It is usually advantageous to use an excess of the amine, for example, about 2 to about 20 molecular equivalents, or even more, of the amine per one molecular equivalent of the pyrimidine. In such a case, the excess amine acts as a diluent. An inert organic diluent can also be present in the reaction mixture. Especially suitable for that purpose are dialkylformamides, particularly those where the dialkyl substituents are the same as those on the displacing amine, and alkanols.

When the reactant amine has a relatively low boiling point and is likely to escape from the reaction vessel during heating, it is advantageous to use a closed reaction vessel, for example, a heavy-wall, sealed, glass tube or a closed metal autoclave for the heating step.

A reaction time of about one to about 20 hours is usually required. The desired displacement reaction usually takes place more rapidly at higher temperatures than at lower. Moreover, when the phenoxy moiety has 2 or 3 halogen substituents, i.e., when $n$ in Formula V or VI is 2 or 3, the displacement usually takes place more rapidly and at a lower temperature than when fewer or no halogen substituent is present. In the latter instances, especially when no halogen substituent is present in the phenoxy moiety, the displacement reaction can often be accelerated by adding sodium or potassium metal to the reaction mixture. Preferably, about one atomic equivalent of the alkali metal is added per molecular equivalent of the pyrimidine reactant. Addition of a catalytic amount of a Lewis acid such as ferric chloride with the alkali metal will also often accelerate the displacement reaction or make feasible a lower reaction temperature. About 0.01 to 0.001 molecular equivalent of ferric chloride per one atomic equivalent of alkali metal is usually a suitable catalytic amount.

Examples of suitable secondary amines for this purpose are dimethylamine, diethylamine, N-methylethylamine, dipropylamine, N-ethylisopropylamine, di-sec-butylamine, N-methylbutylamine, dipentylamine, N-ethyl-2,4-dimethylpentylamine, N-methyloctylamine, diheptylamine, diallylamine, N-methylallylamine, di-(1-methylally) amine, di(2-methylallyl)amine, N-ethyl-1-methylallylamine, N-propyl-2-ethylallylamine, di(2-pentenyl)amine, di(3-butenyl)amine, di(4-hexenyl)amine, N-butyl-2-butenylamine, N-methylcyclohexylamine, dicyclohexylamine, N-ethylbenzylamine, dibenzylamine, di(4-methyl-3-hexenyl)amine, aziridine, 2-methylaziridine, 2,2-dimethylaziridine, azetidine, 2-ethylazetidine, 3-octylazetidine, 3,3-dimethylazetidine, 2,2,4-trimethylazetidine, pyrrolidine, 2-propylpyrrolidine, 3-butylpyrrolidine, 2-isohexylpyrrolidine, 2,3-dimethylpyrrolidine, 2,2,4-trimethylpyrrolidine, 2,5-diethylpyrrolidine, 3,4-dioctylpyrrolidine, piperidine, 2-methylpiperidine, 3-ethylpiperidine, 4-butylpiperidine, 2,4,6-trimethylpiperidine, 2-methyl-5-ethylpiperidine, 3,5-dipentylpiperidine, hexahydroazepine, 2-ethylhexahydroazepine, 4-tert.-butylhexahydroazepine, 3,3-dimethylhexahydroazepine, 2,4,6-tripropylhexahydroazepine, heptamethylenimine, 2-methylheptamethylenimine, 2,4-diisopropylheptamethylenimine, octamethylenimine, 4-isooctyloctamethylenimine, morpholine, 2-ethylmorpholine, 2-methyl-5-ethylmorpholine, 2,6-dimethylmorpholine, N-methylpiperazine, and the like.

The desired Formula III 1,2-dihydro-1-hydroxy-6-alkyl-2-iminopyrimidines or Formula IV 1,6-dihydro-1-hydroxy-2-alkyl-6-iminopyrimidines can usually be isolated from the reaction mixture in free base form by cooling the reaction mixture to a temperature in the range from about 0° to about 25° C. The free base form usually precipitates and can be isolated by conventional techniques, for example, by filtration or centrifugation. Alternatively, excess amine and other diluent, if one is used, can be removed by distillation or evaporation, and the desired compounds isolated by conventional techniques, for example, fractional recrystallization or extraction. The isolated pyrimidine can then be purified, if desired, by conventional techniques, for example, recrystallization from a solvent or a mixture of solvents, or by chromatography. Alternatively, an acid addition salt, e.g., the hydrochloride or acid phosphate of the pyrimidine product can be prepared, purified by recrystallization, and then, if desired, reconverted to the free base in the usual manner.

The following examples further illustrate the present invention:

EXAMPLE I

Preparation of 1,2-dihydro-1-hydroxy-6-methyl-2-[(piperidinomethyl)imino]-4-(1-pyrrolidinyl)-pyrimidine A solution was prepared from 37 percent formaldehyde (about 1.2 milliliters, 0.015 mole) and acetic acid (about 16 milliliters) at about 10° C. Thereafter piperidine (about 1.7 grams, 0.02 mole) was slowly added to the solution. The obtained mixture was stirred until clear (about 10 minutes) and then 1,2-dihydro-1-hydroxy-2-imino-6-methyl-4-(1 - pyrrolidinyl)pyrimidine (about 2.9 grams, 0.015 mole) was slowly added thereto.

Thereafter the resulting solution was stirred at about room temperature for about 20 hours and then evaporated to dryness at a reduced pressure. The produced residue was first extracted with diethyl ether, and then the extracted residue was shaken with an aqueous sodium hydroxide solution and chloroform. The chloroform-containing layer, upon evaporation, yielded about 0.6 gram of the unreacted starting pyrimidine.

The diethyl ether extract was evaporated to dryness. The produced residue was shaken with an aqueous sodium hydroxide solution and chloroform, and the mixture was then filtered. The chloroform layer was concentrated by evaporation to dryness and the obtained residue was extracted with a boiling mixture of hexanes (about 5 x 100 milliliters). The extract was then concentrated by evaporation to about 100 milliliters, cooled, and filtered.

Upon filtration about 1.2 grams of a product melting at about 163° to 166° C. was recovered. The product was identified as 1,2-dihydro-1 - hydroxy-6-methyl-2-[(piperidinomethyl)imino]-4 - (1 - pyrrolidinyl)pyrimidine, obtained in about 28 percent yield.

Analysis for $C_{15}H_{25}N_5O$: Calc'd (percent): C, 61.82; H, 8.65; N, 24.04. Found (percent): C, 62.94; H, 9.07; N, 22.86.

In a manner analogous to Example I but starting with 1,2-dihydro-1-hydroxy-2-imino-6 - methyl - 4 - dimethylaminopyrimidine the 1,2 - dihydro - 1-hydroxy-6-methyl-2 - [(piperidinomethyl)imino] - 4 - dimethylaminopyrimidine can be prepared;

Starting with 1,2-dihydro-1-hydroxy-2-imino-6-methyl-4-diethylaminopyrimidine the 1,2 - dihydro-1-hydroxy-6-methyl-2-[(piperidinomethyl)imino] - 4 - diethylaminopyrimidine can be prepared;

Starting with 1,2-dihydro-1-hydroxy-2-imino-6-methyl-4-dibutylaminopyrimidine the 1,2 - dihydro-1-hydroxy-6-methyl-2-[(piperidinomethyl)imino] - 4 - dibutylaminopyrimidine can be prepared;

Starting with 1,2-dihydro-1-hydroxy-2-imino-6-methyl-4-diallylaminopyrimidine the 1,2-dihydro - 1-hydroxy-6-methyl-2-[(piperidinomethyl)imino] - 4 - diallylaminopyrimidine can be prepared;

Starting with 1,2-dihydro-1-hydroxy-2-imino-6-methyl-4-dicrotylaminopyrimidine the 1,2-dihydro-1-hydroxy-6-methyl-2-[(piperidinomethyl)imino] - 4 - dicrotylaminopyrimidine can be prepared;

Starting with 1,2-dihydro-1-hydroxy-2-imino-6-methyl-4-[di(2-hexenyl)amino]pyrimidine the 1,2-dihydro-1-hydroxy-6-methyl - 2 - [(piperidinomethyl)imino] - 4 - [di-(2-hexenyl)amino]pyrimidine can be prepared;

Starting with 1,2-dihydro-1-hydroxy-2-imino-6-methyl-4-dibenzylaminopyrimidine the 1,2-dihydro-1-hydroxy-6-methyl-2-[(piperidinomethyl)imino] - 4 - dibenzylaminopyrimidine can be prepared;

Starting with 1,2-dihydro-1-hydroxy-2-imino-6-methyl-4-diphenethylaminopyrimidine the 1,2-dihydro-1-hydroxy-6-methyl - 2-[(piperidinomethyl)imino] - 4 - diphenethylaminopyrimidine can be prepared;

Starting with 1,2-dihydro-1-hydroxy-2-imino-6-methyl-4-dicyclohexylaminopyrimidine the 1,2 - dihydro - 1-hydroxy-6-methyl-2-[(piperidinomethyl)imino]-4 - dicyclohexylaminopyrimidine can be prepared;

Starting with 1,2-dihydro-1-hydroxy-2-imino-6-methyl-4-[N-methyl-(4 - tert.-butylcyclohexyl)amino]pyrimidine the 1,2-dihydro - 1 - hydroxy - 6-methyl-2-[(piperidinomethyl)imino]-4-[N-methyl - (4 - tert.-butylcyclohexyl)-amino]pyrimidine can be prepared;

Starting with 1,2-dihydro-1-hydroxy-2-imino-6-methyl-(1 - azetidinyl)pyrimidine the 1,2 - dihydro - 1-hydroxy-6-methyl-2-[(piperidinomethyl)imino]-4-(1 - azetidinyl) pyrimidine can be prepared;

Starting with 1,2-dihydro-1-hydroxy-2-imino-6-methyl-4-[1-(2-methylpyrrolidinyl)]pyrimidine the 1,2-dihydro-1-hydroxy-6-methyl-2-[(piperidinomethyl)imino] - 4 - [1-(2-methylpyrrolidinyl)]pyrimidine can be prepared;

Starting with 1,2-dihydro-1-hydroxy-2-imino-6-methyl-4-[1-(3-ethylpyrrolidinyl)]pyrimidine the 1,2-dihydro-1-hydroxy-6-methyl-2-[(piperidinomethyl)imino] - 4 - [1-(3-ethylpyrrilidinyl)]-pyrimidine can be be prepared;

Starting with 1,2-dihydro-1-hydroxy-2-imino-6-methyl-4-[1-(2,5-dimethylpyrrolidinyl)]pyrimidine the 1,2 - dihydro-1-hydroxy - 6 - methyl - 2 - [(piperidinomethyl)-imino]-4-[1-(2,5-dimethylpyrrolidinyl)]pyrimidine can be prepared;

Starting with 1,2-dihydro-1-hydroxy-2-imino-6-methyl-4-(2-methyl-5-ethylpiperidino)pyrimidine the 1,2-dihydro-1-hydroxy-6-methyl - 2 - [(piperidinomethyl)imino]-4-(2-methyl-5-ethylpiperidino)pyrimidine can be prepared;

Starting with 1,2-dihydro-1-hydroxy-2-imino-6-methyl-4-(3-isopropylpiperidino)pyrimidine the 1,2 - dihydro-1-hydroxy-6-methyl-2 - [(piperidinomethyl)imino]-4-(3-isopropylpiperidino)pyrimidine can be prepared;

Starting with 1,2-dihydro-1-hydroxy-2-imino-6-methyl-4-(2,4,6-trimethylpiperidino)pyrimidine the 1,2-dihydro-1-hydroxy - 6 - methyl-2-[(piperidinomethyl)imino]-4-(2,4,6-trimethylpiperidino)pyrimidine can be prepared;

Starting with 1,2-dihydro-1-hydroxy-2-imino-6-methyl-4-(1-hexahydroazepinyl)pyrimidine the 1,2-dihydro-1-hydroxy - 6-methyl-2-[(piperidinomethyl)imino]-4-(1-hexahydroazepinyl)pyrimidine can be prepared;

Starting with 1,2-dihydro-1-hydroxy-2-imino-6-methyl-4-[1-(4-tert.-butylhexahydroazepinyl)]pyrimidine the 1,2-dihydro - 1 - hydroxy - 6-methyl-2-[(piperidinomethyl) imino] - 4 - [1 - (4-tert.-butylhexahydroazepinyl)]pyrimidine can be prepared;

Starting with 1,2-dihydro-1-hydroxy-2-imino-6-methyl-4 - heptamethyleniminopyrimidine the 1,2-dihydro-1-hydroxy - 6 - methyl - 2 - [(piperidinomethyl)imino]-4-heptamethyleniminopyrimidine can be prepared;

Starting with 1,2-dihydro-1-hydroxy-2-imino-6-methyl-4 - octamethyleniminopyrimidine the 1,2-dihydro-1-hydroxy - 6 - methyl-2-[(piperidinomethyl)imino]-4-octamethyleniminopyrimidine can be prepared;

Starting with 1,2-dihydro-1-hydroxy-2-imino-6-methyl-4 - morpholinopyrimidine the 1,2-dihydro-1-hydroxy-6-methyl - 2 - [(piperidinomethyl)imino]-4-morpholinopyrimidine can be prepared;

Starting with 1,2-dihydro-1-hydroxy-2-imino-6-methyl-4 - (2-ethylmorpholino)pyrimidine the 1,2-dihydro-1-hydroxy-6-methyl-2 - [(piperidinomethyl)imino]-4-(2-ethylmorpholino)pyrimidine can be prepared;

Starting with 1,2-dihydro-1-hydroxy-2-imino-6-methyl-4 - (4-methyl-1-piperazinyl)pyrimidine the 1,2-dihydro-1-hydroxy - 6 - methyl-2-[(piperidinomethyl)imino]-4-(4-methyl-1-piperazinyl)pyrimidine can be prepared;

Starting with 1,2-dihydro-1-hydroxy-2-imino-6-ethyl-4-piperidinopyrimidine the 1,2-dihydro-1-hydroxy-6-ethyl-2-[(piperidinomethyl)imino]-4-piperidinopyrimidine can be prepared;

Starting with 1,2-dihydro-1-hydroxy-2-imino-6-propyl-4-piperidinopyrimidine the 1,2-dihydro-1-hydroxy-6-propyl - 2 - [(piperidinomethyl)imino]-4-piperidinopyrimidine can be prepared;

Starting with 1,2-dihydro-1-hydroxy-2-imino-6-tert.-butyl-4-piperidinopyrimidine the 1,2-dihydro-1-hydroxy-6-tert. - butyl - 2 - [(piperidinomethyl)imino]-4-piperidinopyrimidine can be prepared;

Starting with 1,2-dihydro-1-hydroxy-2-imino-6-octyl-4-piperidinopyrimidine the 1,2 - dihydro-1-hydroxy-6-ethyl-2-[(piperidinomethyl)imino]-4-piperidinopyrimidine can be prepared;

Starting with 1,2 - dihydro-1-hydroxy-2-imino-5,6-dimethyl-4-piperidinopyrimidine the 1,2-dihydro-1-hydroxy-5,6 - dimethyl-2-[(piperidinomethyl)imino]-4-piperidinopyrimidine can be prepared;

Starting with 1,2-dihydro-1-hydroxy-2-imino-5-methyl-6 - ethyl - 4-piperidinopyrimidine the 1,2-dihydro-1-hydroxy-5-methyl-6-ethyl-2 - [(piperidinomethyl)imino]-4-piperidinopyrimidine can be prepared;

Starting with 1,2-dihydro-1-hydroxy-2-imino-5-octyl-6-propyl-4-piperidinopyrimidine the 1,2-dihydro-1-hydroxy-5 - octyl - 6 - propyl-2-[(piperidinomethyl)imino]-4-piperidinopyrimidine can be prepared;

Starting with 1,2-dihydro-1-hydroxy-2-imino-5-tert.-butyl-6-propyl-4-piperidinopyrimidine the 1,2-dihydro-1-hydroxy - 5 - tert.-butyl-6-propyl-2-[(piperidinomethyl)imino]-4-piperidinopyrimidine can be prepared; etc.

In a like manner the 1,6-dihydro compounds that are suitable as starting materials can be employed. For example, starting with 1,6-dihydro-1-hydroxy-2-methyl-6-imino-4-piperidinopyrimidine the 1,6-dihydro-1-hydroxy-2-methyl-6-[(piperidinomethyl)imino] - 4 - piperidinopyrimidine can be prepared;

Starting with 1,6-dihydro-1-hydroxy-2-methyl-6-imino-4-dimethylaminopyrimidine the 1,6-dihydro-1-hydroxy-2-methyl - 6 - [(piperidinomethyl)imino]-4-dimethylaminopyrimidine can be prepared;

Starting with 1,6-dihydro-1-hydroxy-2-methyl-6-imino-4 - dibutylaminopyrimidine the 1,6-dihydro-1-hydroxy-2-methyl - 6 - [(piperidinomethyl)imino]-4-dibutylaminopyrimidine can be prepared;

Starting with 1,6-dihydro-1-hydroxy-2-methyl-6-imino-4- diallylaminopyrimidine the 1,6-dihydro-1-hydroxy-2-methyl - 6 - [(piperidinomethyl)imino]-4-diallylaminopyrimidine can be prepared;

Starting with 1,6-dihydro-1-hydroxy-2-methyl-6-imino-4-[di-(2-hexenyl)amino]pyrimidine the 1,6-dihydro-1-hydroxy-2-methyl-6-[(piperidinomethyl)imino]- 4 -[di-(2-hexenyl)amino]pyrimidine can be prepared;

Starting with 1,6-dihydro-1-hydroxy-2-methyl-6-imino-4-dibenzylaminopyrimidine the 1,6-dihydro-1-hydroxy-2-methyl-6-[(piperidinomethyl)imino]- 4 -dibenzylaminopyrimidine can be prepared;

Starting with 1,6-dihydro-1-hydroxy-2-methyl-6-imino-4 - dicyclohexylaminopyrimidine the 1,6 - dihydro-1-hydroxy - 2-methyl-6-[(piperidinomethyl)imino]-4-dicyclohexylaminopyrimidine can be prepared; etc.

By the same token, reacting pyrrolidine instead of piperidine in the procedure set forth in Example I with 1,2-dihydro - 1 - hydroxyl-2-imino-6-methyl-4-(1-pyrrolidinyl)pyrimidine the 1,2 - dihydro-1-hydroxy - 6 - methyl-2-[(1-pyrrolidinylmethyl)imino] - 4 - (1-pyrrolidinyl)pyrimidine can be prepared.

Similarly, starting with 1,6-dihydro-1-hydroxy-2-methyl - 6 - imino-4-[1-(2,5-dimethylpyrrolidinyl)]pyrimidine the 1,6 - dihydro-1-hydroxy-2-methyl-6-[(1-pyrrolidinylmethyl)imino] - 4 - [1-(2,5-dimethylpyrrolidinyl)]pyrimidine can be prepared;

Starting with 1,6-dihydro-1-hydroxy-2-methyl-6-imino-4 - (2-methyl-5-ethylpiperidino)pyrimidine the 1,6-dihydro - 1 - hydroxy-2-methyl-6-[(1-pyrrolidinylmethyl)imino] - 4 - (2-methyl-5-ethylpiperidino)pyrimidine can be prepared;

Starting with 1,6-dihydro-1-hydroxy-2-methyl-6-imino-4 - (1-hexahydroazepinyl)pyrimidine the 1,6-dihydro-1-hydroxy - 2 - methyl-6-[(1-pyrrolidinylmethyl)imino]-4-(1-hexahydroazepinyl)pyrimidine can be prepared;

Starting with 1,6-dihydro-1-hydroxy-2-methyl-6-imino-4 - heptamethyleniminopyrimidine the 1,6-dihydro-1-hydroxy - 2 - methyl-6-[(1-pyrrolidinylmethyl)imino]-4-heptamethyleniminopyrimidine can be prepared;

Starting with 1,6 - dihydro - 1 - hydroxy - 2 - methyl-6-imino-4-(2 - ethylmorpholino)pyrimidine the 1,6 - dihydro - 1 - hydroxy - 2 - methyl-6-[(1-pyrrolidinylmethyl)imino] - 4 - (2 - ethylmorpholino)pyrimidine can be prepared;

Starting with 1,6 - dihydro - 1 - hydroxy - 2 - methyl-6-imino - 4 - (4-methyl - 1 - piperazinyl)pyrimidine the 1,6-dihydro - 1 - hydroxy - 2 - methyl - 6 - [(1-pyrrolidinylmethyl)imino] - 4 - ( 4 - methyl - 1 - piperazinyl)-pyrimidine can be prepared;

Starting with 1,6-dihydro-1-hydroxy-2-octyl-6-imino-4-piperidinopyrimidine the 1,6-dihydro-1-hydroxy-2-octyl-6-[(1-pyrrolidinylmethyl)imino] - 4 - piperidinopyrimidine can be prepared;

Starting with 1,6 - dihydro - 1 - hydroxy - 2 - propyl-5-octyl - 6 - imino - 4 - piperidinopyrimidine the 1,6 - dihydro - 1 - hydroxy - 2 - propyl - 5 - octyl - 6 - [(1-pyrrolidinylmethyl)imino] - 4 - piperidinopyrimidine can be prepared, etc.

EXAMPLE II

Preparation of 1,2-dihydro-1-hydroxy-6-methyl-2-[(piperidinomethyl)imino]-4-piperidinopyrimidine A solution was prepared from 37 percent formaldehyde (about 2.4 milliliters, 0.03 mole) and acetic acid (about 32 milliliters) at about 10° C., and piperidine (about 3.4 grams, 0.04 mole) was added thereto. The resulting mixture was then stirred at about 10° C. and 1,2-dihydro-1-hydroxy-2-imino - 6 - methyl - 4 - piperidinopyrimidine (about 6 grams, 0.029 mole) was combined therewith. The obtained solution was stirred, and the temperature thereof was permitted to rise to about room temperature.

Thereafter the solution was concentrated by evaporation to dryness under reduced pressure. The obtained residue was dissolved in diethyl ether, and the diethyl ether solution shaken with moist sodium bicarbonate. The diethyl ether solution was then filtered, dried over potassium carbonate, and then evaporated to dryness. The produced residue was extracted with about 800 milliliters of mixed hexanes, and the obtained extract refrigerated. A crystalline product was observed to form upon refrigeration and was recovered.

The product had a melting point of about 174° to 179° C. and was identified as 1,2 - dihydro - 1 - hydroxy-6-methyl - 2 - [(piperidinomethyl)imino] - 4 - piperidinopyrimidine, obtained in about 11 percent yield.

Analysis for $C_{16}H_{27}N_5O$. Calc'd (percent): C, 62.92; H, 8.91; N, 22.93. Found (percent): C, 62.94; H, 8.50; N, 21.88.

EXAMPLE III

Preparation of 1,2-dihydro-1-hydroxy-6-methyl-2-[(piperidinomethyl)imino]-4-morpholinopyrimidine In a manner analogous to Example II, 1,2-dihydro-1-hydroxy - 2 - imino - 6 - methyl - 4 - morpholinopyrimidine was reacted with formaldehyde and piperidine in the presence of acetic acid. A crystalline compound melting at about 191° to 194° C. was produced. The compound was identified as 1,2-dihydro - 1 - hydroxy - 6 - methyl-2-[(piperidinomethyl)imino] - 4 - morpholinopyrimidine, obtained in about 3.7 percent yield.

Analysis for $C_{15}H_{25}N_5O_2 \cdot \frac{1}{3}H_2O$. Calc'd (percent): C, 57.48; H, 8.23; N, 22.35. Found (percent): C, 57.63; H, 8.35; N, 22.58.

EXAMPLE IV

Preparation of 1,2-dihydro-1-hydroxy-6-methyl-2-[(dimethylaminomethyl)imino]-4-morpholinopyrimidine In a manner analogous to Example II, 1,2-dihydro-1-hydroxy - 2 - imino - 6 - methyl - 4 - morpholinopyrimidine was reacted with formaldehyde and dimethylamine in the presence of acetic acid. A crystalline compound melting at about 154° to 156° C. was produced. The compound was identified as 1,2-dihydro - 1 - hydroxy-6 - methyl - 2 - [(dimethylaminomethyl)imino] - 4 - morpholinopyrimidine, obtained in about 12.5 percent yield.

Analysis for $C_{12}H_{21}N_5O_2 \cdot \frac{1}{2}H_2O$. Calc'd. (percent): C, 52.10; H, 8.08; N, 25.34. Found (percent): C, 52.13; H, 8.04; N, 25.21.

The compounds of this invention possess pharmacological activity and are useful for the lowering of blood pressure in animals. The compounds can be administered orally or parenterally in association with a compatible pharmaceutical carrier in solid or liquid dosage forms such as tablets, capsules, powders, pills, granules, syrups, elixirs, suppositories, sterile aqueous or vegetable oil dispersions for parenteral use, and the like. The compounds of this invention can be used alone or in combination with other drugs, for example, in combination with diuretics, peripheral vasodilators, tranquilizers, sedatives, muscle relaxants, anti-histamines, and the like.

Powders can be prepared by comminuting the active ingredient to a suitable fine size and mixing with a similarly comminuted diluent. The diluent can be an edible carbohydrate material such as starch. Advantageously, a sweetening agent can be added as well as a flavouring agent.

Capsules can be produced by preparing a powder mixture as hereinbefore described and filling into formed gelatin sheets. As an adjuvant to the filling operation, a lubricant such as talc, magnesium stearate and calcium stearate can also be added to the powder mixture before the filling operation.

Tablets can be made by preparing a powder mixture, granulating or slugging, adding a lubricant and pressing into tablets. The powder mixture is prepared by mixing the active ingredient suitably comminuted, with a diluent or base such as starch, lactose, kaolin, dicalcium phosphate, calcium sulfate, and the like. The powder mixture can be granulated by wetting with a binder such as syrup, gelatin solution, methylcellulose solution or acacia mucilage and forcing through a screen. As an alternative to wet granulating, the powder mixture can be slugged, i.e., run through a tablet machine and the resulting large tablets broken down into granules. The granules are further lubricated to prevent sticking to the tablet-forming dies by the addition of stearic acid, a stearate salt, talc, or mineral oil. The lubricated mixture can then be compressed into tablets.

In addition, the tablet can be provided with a protective coating consisting of a sealing coat of shellac, a coating of sugar and methylcellulose, and a polish coating of carnauba wax.

Oral fluids can be prepared in unit dosage forms such as syrups and elixirs wherein each teaspoonful of composition contains a predetermined amount of active ingredient for administration.

A syrup can be prepared by dispersing the active ingredient in a suitably flavored aqueous sucrose solution. Similarly an elixir can be prepared utilizing an aqueous-alcoholic vericle. Elixirs are advantageous vehicles for use when a therapeutic agent which is not sufficiently water-soluble is present as an ingredient in the composition.

For parenteral administration aqueous fluid unit dosage forms can be prepared. In preparing the parenteral form, a measured amount of active ingredient is placed in a vial, and the vial and its contents are sterilized and sealed. An accompanying vial of sterile water for injection can be provided as a vehicle to form a dispersion prior to administration. If desired, the sterile water can have dissolved therein a local anesthetic and buffering agent. Parenteral aqueous solutions can also be made by utilizing a pharmacologically acceptable salt of the active ingredient, such as those mentioned hereinabove.

Alternatively, a parenteral suspension can be prepared by suspending the active ingredient in a parenterally acceptable vegetable oil with or without additional adjuvants, and sterilizing after filling into vials.

For veterinary oral use the active ingredient can be conveniently prepared in the form of a food premix. The food premix can comprise the active ingredient in admixture with an edible pharmaceutical diluent such as starch, oatmeal, flour, calcium carbonate, talc, dried fish meal, and the like. The prepared premix is then added to the regular feed, thereby providing medication to the animal in the course of feeding.

The term "unit dosage form" as used in the specification and the claims refers to physically discrete units suitable as unitary dosages for animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such active material for therapeutic use as disclosed in detail in the specification, these being features of the present invention. Examples of suitable unit dosage forms in accord with this invention are tablets, capsules, pills, powder packets, granules, wafers, cachets, suppositories, segregated multiples of any of the foregoing, and other forms as herein described.

The amount of active ingredient that is to be administered depends on the age, weight of the recipient, the particular condition to be treated, the frequency of administration, and the route of administration. The dose range is from about 0.1 to about 30 mg. per kg. of body weight, preferably about 0.3 to about 10 mg. per kg. of body weight.

The following examples relate to the use of the novel compounds of this invention as blood pressure lowering agents. The examples relate to that use of 1,2-dihydro-1-hydroxy-6-methyl-2 - [(piperidinomethyl)imino]-4-piperidinopyrimidine and of 1,2-dihydro-1-hydroxy-6-methyl-2-[(piperidinomethyl)imino] - 4 - (1-pyrrolidinyl)pyrimidine. The other novel compounds of this invention can be used in a similar manner, thus the examples below should not be construed as limiting.

EXAMPLE V

Tablets 20,000 scored tablets for oral use, each containing 200 milligrams of 1,2-dihydro-1-hydroxy-6-methyl-2-[(piperidinomethyl)imino]-4-piperidinopyrimidine free base are prepared from the following ingredients:

| | Grams |
|---|---|
| 1,2-dihydro-1-hydroxy - 6 - methyl-2-[(piperidinomethyl)imino]-4-piperidinopyrimidine, micronized | 4,000 |
| Starch, U.S.P. | 350 |
| Talc, U.S.P. | 250 |
| Calcium stearate | 35 |

The micronized 1,2-dihydro-1-hydroxy - 6 - methyl-2-[(piperidinomethyl)imino] - 4 - piperidinopyrimidine free base is granulated with a 4 percent w./v. aqueous solution of methylcellulose U.S.P. (1500 cps.). To the dried granules is added a mixture of the remainder of the ingredients and the final mixture is compressed into tablets of proper weight.

EXAMPLE VI

Capsules 20,000 two-piece hard gelatin capsules for oral use, each containing 100 milligrams of 1,2-dihydro-1-hydroxy-6-methyl-2-[(piperidinomethyl)imino]-4-piperidinopyrimidine are prepared from the following ingredients.

| | Grams |
|---|---|
| 1,2-dihydro-1-hydroxy - 6 - methyl-2-[(piperidinomethyl)imino]-4-piperidinopyrimidine | 2,000 |
| Lactose, U.S.P. | 1,000 |
| Starch, U.S.P. | 300 |
| Talc, U.S.P. | 65 |
| Calcium stearate | 25 |

The micronized 1,2-dihydro-1-hydroxy - 6 - methyl-2-[(piperidinomethyl)imino] - 4 - piperidinopyrimidine is mixed with the starch-lactose mixture followed by the talc and calcium stearate. The final mixture is then encapsulated in the usual manner.

Capsules containing 10, 25, 50 and 350 milligrams of 1,2 - dihydro-1-hydroxy-6-methyl-2-[(piperidinomethyl)-imino]-4-piperidinopyrimidine free base can also be prepared by substituting 200, 500, 1000 and 7000 grams for 2000 grams in the above formulation.

EXAMPLE VII

Soft elastic capsules

One-piece soft elastic capsules for oral use, each containing 5 milligrams of 1,2-dihydro-1-hydroxy-6-methyl-2-[(piperidinomethyl)imino] - 4 - (1-pyrrolidinyl)pyrimidine are prepared in the usual manner by first dispersing the powdered active material in sufficient corn oil to render the material capsulatable.

EXAMPLE VIII

Aqueous preparation

An aqueous preparation for oral use containing in each 5 milliliters, 50 milligrams of 1,2-dihydro-1-hydroxy-6-methyl-2-[(piperidinomethyl)imino] - 4-piperidinopyrimidine is prepared from the following ingredients:

|  | Grams |
|---|---|
| 1,2-dihydro-1-hydroxy - 6 - methyl-2-[(piperidinomethyl)imino]-4-piperidinopyrimidine | 100 |
| Methylparaben, U.S.P. | 7.5 |
| Propylparaben, U.S.P. | 2.5 |
| Saccharin sodium | 12.5 |
| Cyclamate sodium | 2.5 |
| Glycerin, 3,000 milliliters. |  |
| Tragacanth powder | 10 |
| Orange oil flavor | 10 |
| F.D. and C. Orange Dye | 7.5 |
| Deionized water, q.s. to 10,000 milliliters. |  |

EXAMPLE IX

Parenteral suspension

A sterile aqueous suspension suitable for intramuscular injection and containing in each milliliter, 25 milligrams of 1,2 - dihydro-1-hydroxy-6-methyl-2-[(piperidinomethyl)imino]-4-(1-pyrrolidinyl)pyrimidine is prepared from the following ingredients:

|  | Grams |
|---|---|
| Polyethylene glycol 4000, U.S.P. | 3 |
| Sodium chloride | 0.9 |
| Polysorbate 80, U.S.P. | 0.4 |
| Sodium metabisulfite | 0.1 |
| Methylparaben, U.S.P. | 0.18 |
| Propylparaben, U.S.P. | 0.02 |
| 1,2-dihydro-1-hydroxy-6-methyl-2-[(piperidinomethyl)imino]-4-(1-pyrrolidinyl)-pyrimidine free base (micronized) | 2.5 |
| Water for injection, q.s. to 100 milliliters. |  |

EXAMPLE X

Aqueous solution

An aqueous solution for oral use and containing in each 5 milliliters, 25 milligrams of 1,2-dihydro-1-hydroxy-6-methyl - 2 - [(piperidinomethyl)imino]-4-(1-pyrrolidinyl) pyrimidine is prepared from the following ingredients:

1,2-dihydro-1-hydroxy-6-methyl - 2 - [(piperidinomethyl) imino]-4-(1-pyrrolidinyl)pyrimidine—5 grams
Deionized water, q.s. to 1,000 milliliters.

I claim:
1. A pyrimidine N-oxide which is a member of the group consisting of a 1,2-dihydro-1-hydroxy-6-alkyl-2-(aminomethylimino)pyrimidine represented by the formula:

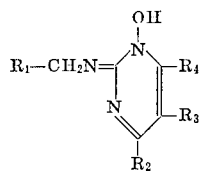

and a 1,6 - dihydro-1-hydroxy - 2 - alkyl-6-(aminomethylimino)pyrimidine represented by the formula:

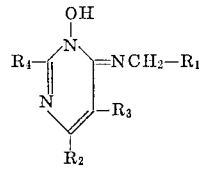

wherein $R_1$ and $R_2$ are members of the group consisting of disubstituted amino moieties of the type

in which $R_5$ and $R_6$ are selected from the group consisting of lower alkyl of 1 to 8 carbon atoms, inclusive, lower alkenyl of 1 to 8 carbon atoms, inclusive, phenylalkyl of 7 to 12 carbon atoms, inclusive, naphthylalkyl of 11 to 12 carbon atoms, inclusive, and lower cycloalkyl of 3 to 8 carbon atoms, inclusive, and of the heterocyclic amino moieties aziridinyl, azetidinyl, pyrrolidinyl, piperidino, hexahydroazepinyl, heptamethylenimino, octamethylenimino, morpholino, and 4-(lower alkyl of 1 to 8 carbon atoms, inclusive) piperazinyl, each of said heterocyclic moieties having attached as substituents on carbon atoms thereof zero to three lower alkyl groups of 1 to 8 carbon atoms, inclusive, and a nitrogen atom of each of said heterocyclic moieties being the point of attachment of $R_1$ and $R_2$; wherein $R_3$ is hydrogen or lower alkyl of 1 to 8 carbon atoms, inclusive, and wherein $R_4$ is lower alkyl of 1 to 8 carbon atoms, inclusive, and the corresponding pharmaceutically acceptable acid addition salts.

2. A 1,2-dihydro-1-hydroxy-6-alkyl - 2 - (aminomethylimino)pyrimidine represented by the formula:

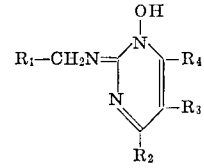

wherein $R_1$ and $R_2$ are members of the group consisting of disubstituted amino moieties of the type

in which $R_5$ and $R_6$ are selected from the group consisting of lower alkyl of 1 to 8 carbon atoms, inclusive, lower alkenyl of 1 to 8 carbon atoms, inclusive, phenylalkyl of 7 to 12 carbon atoms, inclusive, naphthylalkyl of 11 to 12 carbon atoms, inclusive, and lower cycloalkyl of 3 to 8 carbon atoms, inclusive, and of the heterocyclic amino moieties aziridinyl, azetidinyl, pyrrolidinyl, piperidino, hexahydroazepinyl, heptamethylenimino, octamethylenimino, morpholino, and 4-(lower alkyl of 1 to 8 carbon atoms, inclusive)piperazinyl, each of said heterocyclic moieties having attached as substituents on carbon atoms thereof zero to three lower alkyl of 1 to 8 carbon atoms, inclusive, groups, inclusive, and a nitrogen atom of each of said heterocyclic moieties being the point of attachment of $R_1$ and $R_2$; wherein $R_3$ is hydrogen or lower alkyl of 1 to 8 carbon atoms, inclusive, and wherein $R_4$ is lower alkyl of 1 to 8 carbon atoms, inclusive, and the corresponding pharmaceutically acceptable acid addition salts.

3. A 1,2-dihydro-1-hydroxy-6-alkyl-2-(aminomethylimino)pyrimidine in accordance with claim 2, wherein $R_1$ is piperidino, $R_2$ is 1-pyrrolidinyl, $R_3$ is hydrogen, and $R_4$ is methyl.

4. A 1,2-dihydro-1-hydroxy-6-alkyl-2-(aminomethylimino)pyrimidine in accordance with claim 2, wherein $R_1$ is piperidino, $R_2$ is piperidino, $R_3$ is hydrogen, and $R_4$ is methyl.

5. A 1,2-dihydro-1-hydroxy-6-alkyl-2-(aminomethylimino)pyrimidine in accordance with claim 2, wherein $R_1$ is piperidino, $R_2$ is morpholino, $R_3$ is hydrogen, and $R_4$ is methyl.

6. A 1,2-dihydro-1-hydroxy-6-alkyl-2-(aminomethylimino)pyrimidine in accordance with claim 2, wherein $R_1$ is dimethylamino, $R_2$ is morpholino, $R_3$ is hydrogen, and $R_4$ is methyl.

7. A 1,6-dihydro-1-hydroxy-2-alkyl-6-(aminomethylimino)pyrimidine represented by the formula:

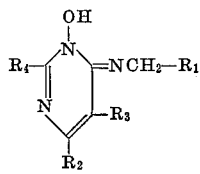

wherein $R_1$ and $R_2$ are members of the group consisting of disubstituted amino moieties of the type

in which $R_5$ and $R_6$ are selected from the group consisting of lower alkyl of 1 to 8 carbon atoms, inclusive, lower alkenyl of 1 to 8 carbon atoms, inclusive, phenylalkyl of 7 to 12 carbon atoms, inclusive, naphthylalkyl of 11 to 12 carbon atoms, inclusive, and lower cycloalkyl of 3 to 8 carbon atoms, inclusive, and of the heterocyclic amino moieties aziridinyl, azetidinyl, pyrrolidinyl, piperidino, hexahydroazepinyl, heptamethylenimino, octamethylenimino, morpholino, and 4-(lower alkyl of 1 to 8 carbon atoms, inclusive)piperazinyl, each of said heterocyclic moieties having attached as substituents on carbon atoms thereof zero to three lower alkyl of 1 to 8 carbon atoms, inclusive, groups, inclusive, and a nitrogen atom of each of said moieties being the point of attachment of $R_1$ and $R_2$; wherein $R_3$ is hydrogen or lower alkyl of 1 to 8 carbon atoms, inclusive, and wherein $R_4$ is lower alkyl of 1 to 8 carbon atoms, inclusive, and the corresponding pharmaceutically acceptable acid addition salts.

References Cited

UNITED STATES PATENTS 3,382,247  6/1968  Anthony et al. _____ 260—256.4

OTHER REFERENCES

Walker: Formaldehyde, Rheinhold, 1953, N.Y., 2nd edition, pp. 281–283, 287–290, and 306–307.

ALEX MAZEL, Primary Examiner

A. M. T. TIGHE, Assistant Examiner

U.S. Cl. X.R.

260—256.4, 256.5; 424—200, 230, 251

UNITED STATES PATENT OFFICE
CERTIFICATE OF CORRECTION

Patent No. 3,551,420      Dated 12-29-70

Inventor(s) William C. Anthony

It is certified that error appears in the above-identified patent and that said Letters Patent are hereby corrected as shown below:

Column 1, line 35, for "R₃" read -- R₄ --. Column 2, line 28 for "  " read -- 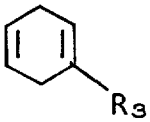 --. Column 4, line 10, for "ethylorpholino" read -- ethylmorpholino --. Column 5, line for "NH₃" read -- NH₂ --. Column 6, line 56, for "centrifigu tion" read -- centrifugation --. Column 7, line 23, for "dilents" read -- diluents --. Column 7, lines 23-24, for "inclde" read -- include --. Column 7, line 55, for "R₂ as" read -- R₂ is as --. Column 8, line 24, for "methylally" rea -- methylallyl --. Column 10, line 7, for "ethylpyrrilidinyl read -- ethylpyrrolidinyl --. Column 11, line 43, for "hydroxyl" read -- hydroxy --. Column 13, line 45, for "veri read -- vehicle --.

Signed and sealed this 1st day of June 1971.

(SEAL)
Attest:

EDWARD M. FLETCHER, JR.
Attesting Officer

WILLIAM E. SCHUYLER, JR
Commissioner of Patents